United States Patent [19]
Alex et al.

[11] Patent Number: 6,051,649
[45] Date of Patent: *Apr. 18, 2000

[54] FILMS BASED ON POLYAMIDES AND ON POLYOLEFINS

[75] Inventors: Patrick Alex, Limours Pecquese; Denis Melot, Bernay, both of France

[73] Assignee: Elf Atochem S.A., Puteaux, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,175

[22] Filed: Jan. 30, 1997

[30] Foreign Application Priority Data

Jan. 31, 1996 [FR] France ................................ 96 01145

[51] Int. Cl.$^7$ ...................................................... C08L 77/00
[52] U.S. Cl. ............................ 525/66; 525/92 A; 525/179
[58] Field of Search ..................... 525/66, 92 A, 525/179

[56] References Cited

U.S. PATENT DOCUMENTS 5,213,744  5/1993  Bossaert ................................ 264/171
5,342,886  8/1994  Glotin et al. .

FOREIGN PATENT DOCUMENTS

| 1-559284 | 9/1993 | European Pat. Off. . |
|---|---|---|
| 4-314741 | 11/1992 | Japan . |
| 05202239 | 8/1993 | Japan . |
| 5-202239 | 8/1993 | Japan . |
| 5 230365 | 9/1993 | Japan . |
| 5-655941 | 5/1986 | Switzerland . |
| 2112789 | 7/1983 | United Kingdom . |

*Primary Examiner*—Patricia A. Short
*Attorney, Agent, or Firm*—Pennie & Edmonds LLP

[57] ABSTRACT

The invention relates to films made of compositions comprising:
- at least one polyamide (A),
- at least one polymer (B) comprising polyamide blocks and polyether blocks,
- at least one polyolefin (C), and
- at least one functionalized polyolefin (D); such that the impact strength (Dart Test) is greater than that of a film containing the same proportions of (A), (C) and (D) but not containing (B).

6 Claims, No Drawings

FILMS BASED ON POLYAMIDES AND ON POLYOLEFINS

TABLE OF CONTENTS

1. Background of The Invention
1.1 Technical Field
1.2 Description of The Related Art
2. 2.1 Description of The Invention
3. Description of The Preferred Embodiments
4. Claim
4. Abstract

1. BACKGROUND OF THE INVENTION

1.1 Technical Field

The present invention relates to films made of compositions based on polyamides and on polyolefins and more particularly to compositions comprising:

- at least one polyamide (A),
- at least one polymer (B) comprising polyamide blocks and polyether blocks,
- at least one polyolefin (C), and
- at least one functionalized polyolefin (D);

such that the impact strength (Dart Test) is greater than that of a film containing the same proportions of (A), (C) and (D) but not containing (B).

The compositions of the invention can also be characterized by a structure with a polyamide matrix, that is to say that the matrix retains many of the properties of polyamides.

1.2 Description of Related Art

The prior Japanese Patent JP 04-314,741 describes films composed of a mixture of (i) polyamide-6 and (ii) polyetheresteramide. The polyetheresteramide is a block polymer obtained by condensation of polytetramethylene glycol and polyamide blocks containing carboxylic acid ends. The polyamide blocks originate from polycaprolactam (PA-6) or from polydodecalactam (PA-12). The amount of polyetheresteramide is between 0.5% and 9% by weight of the mixture.

The property of this film is to withstand bending at 0° C. according to Method 101 c of the MIL-B-131 F standard. The number of holes produced during 1,000 bending operations is measured.

If the amount of polyetheresteramide is too low, the number of perforations is significant; if the amount of polyetheresteramide is too high, the transparency and the mechanical properties of the film are reduced.

In this reference, the polyetheresteramide present is such that the proportion or ratio by weight of the polyamide blocks to the polyether blocks is in the range from 45/55 to 30/70.

It is useful for the polyamide films which are used in the food industry to exhibit good resistance to bending, in particular, at low temperatures for the packaging of deep-frozen food. However, it is also essential for packaging films for deep-frozen products (or products to be deep-frozen) to withstand perforation from the projecting parts or from the sharp edges of these products. It is also useful, during transportation of the deep-frozen product and its handling, for the projecting parts and the sharp edges not to cause perforation of the film.

This property is also desirable for the packaging of sterilized medical supplies. Indeed, perforation of the film would cause entry of air and thus contamination.

2. DESCRIPTION OF THE INVENTION

It has been found that the test which is most representative of this strength needed to resist bending and preforation is the impact strength as determined by the falling dart test (Dart Test). In this test, a punch falls from a certain height onto the film, thereby impacting upon it. The Dart Test can be carried out according to Method A or Method B.

The films of the invention also exhibit an improved tear strength in comparison with the films containing the same proportions of (A), (C) and (D) but not containing (B), whether this tear is in the direction parallel to or perpendicular to the extrusion direction.

Polyamide (A) is understood to mean the condensation product of:

one or a number of amino acids, such as aminocaproic, 7-aminoheptanoic, 11-aminoundecanoic and 12-aminododecanoic acids, or one or a number of lactams, such as caprolactam, oenantholactam and lauryllactam;

one or a number of salts or mixtures of diamines, such as hexamethylenediamine, dodecamethylenediamine, meta-xylylenediamine, bis-(p-aminocyclohexyl) methane and trimethylhexamethylene-diamine, with diacids, such as isophthalic, terephthalic, adipic, azelaic, suberic, sebacic and dodecanedicarboxylic acids; or mixtures of some of these monomers, which result in copolyamides, for example PA-6/12 (or nylon-6/12) by condensation of caprolactam and lauryllactam.

Polyamide mixtures can be used. Use is advantageously made of PA-6 and PA-6,6.

The polymers containing polyamide blocks and polyether block(s) result from the copolycondensation of polyamide sequences containing reactive ends with polyether sequences containing reactive ends, such as, inter alia:

1) Polyamide sequences containing diamine chain ends with polyoxylakylene sequences containing dicarboxyl chain ends, 2) Polyamide sequences containing dicarboxyl chain ends with polyoxyalkylene sequences containing diamine chain ends obtained by cyanoethylation and hydrogenation of a α,ω-dihydroxylated aliphatic polyoxylakylene sequences known as polyetherdiols, 3) Polyamide sequences containing dicarboxyl chain ends with polyetherdiols, the products obtained being, in this specific case, polyetheresteramides.

The polyamide sequences containing dicarboxyl chain ends result, for example, from the condensation of α,ω-aminocarboxylic acids from lactams or of dicarboxylic acids and diamines in the presence of a chain-limiting dicarboxylic acid. The polyamide blocks are advantageously formed from polyamide-12.

The number-average molecular mass or weight Mn of the polyamide sequences is between 300 and 15,000 and preferably between 600 and 5,000. The Mn of the polyether sequences is between 100 and 6,000 and preferably between 200 and 3,000.

The polymers containing polyamide blocks and polyether blocks can also comprise units distributed randomly. These polymers can be prepared by the simultaneous reaction of the polyether and the precursors of the polyamide blocks.

For example, polyetherdiol, a lactam (or an α,ω-amino acid) and a chain-limiting diacid can be reacted in the presence of a small amount of water. A polymer is obtained having essentially polyether blocks and polyamide blocks of highly variable length but also the various reactants, which have reacted randomly, distributed statistically along the polymer chain.

These polymers contain polyamide blocks and polyether blocks, whether they originate from the copolycondensation of polyamide and polyether sequences prepared beforehand or from a single-stage reaction, exhibit, for example, Shore D hardnesses which can be between 20 and 75 and advantageously between 30 and 70 and an intrinsic viscosity between 0.8 and 2.5, measured in metacresol at 25° C.

Whether the polyether blocks derive from polyethylene glycol, from polypropylene glycol or from polytetramethylene glycol, they are either used as they are and copolycondensed with polyamide blocks containing carboxyl ends or they are aminated in order to be converted to polyetherdiamines and condensed with polyamide blocks containing carboxyl ends. They can also be mixed with polyamide precursors and a chain limiter in order to prepare polymers containing polyamide blocks and polyether blocks having units distributed statistically.

Polymers containing polyamide blocks and polyether blocks are described in U.S. Pat. Nos. 4,331,786; 4,115,475; 4,195,015; 4,839,441; 4,864,0143; 4,230,838 and 4,332,920.

The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are introduced into the chain of the polymer containing polyamide blocks and polyether blocks in the form of diols or diamines, they are known for simplicity as PEG blocks or PPG blocks or alternatively PTMG blocks.

It would not be departing from the scope of the invention if the polyether blocks contained different units, such as units derived from ethylene glycol, from propylene glycol or alternatively from tetramethylene glycol.

The polyamide blocks preferably comprise the same units as the polyamide (A).

The polymer containing polyamide blocks and polyether blocks preferably comprises a single type of polyamide block and a single type of polyether block. Use is advantageously made of polymers containing PA-6 blocks and PTMG blocks.

It is also possible to use a mixture of two polymers containing polyamide blocks and polyether blocks.

Advantageously, the polymer containing polyamide blocks and polyether blocks is such that the polyamide is the major constituent by weight, that is to say that the amount of polyamide which is in the form of blocks and that which is, optionally, distributed statistically in the chain represents 50% by weight or more of the polymer containing polyamide blocks and polyether blocks. Advantageously, the amount of polyamide and the amount of polyether are in the ratio (polyamide/polyether) of 50/50 to 80/20.

Preferably, the polyamide blocks and the polyether blocks of the same polymer (B), respectively, have mass or weight Mn of 1,000/1,000, 1,300/650, 2,000/1,000, 2,600/650 and 4,000/1,000.

The polyolefin (C) is a polymer comprising olefin units, such as, for example, ethylene, propylene or 1-butene units or any other α-olefin unit. Mention may be made, by way of example, of:

polyethylenes, such as LDPE, HDPE, LLDPE, or VLDPE, polypropylene, ethylene/propylene copolymers, EPRs (ethylene/propylene rubber) or alternatively PE metallocenes, styrene/ethylene-butene/styrene (SEBS) block copolymers, styrene/butadiene/styrene (SBS) block copolymers, styrene/isoprene/styrene (SIS) block copolymers, styrene/ethylene-propylene/styrene block copolymers or ethylene/propylene/diene (EPDM) block copolymers, copolymers of ethylene with at least one product chosen from the salts or the esters of unsaturated carboxylic acids or the vinyl esters of saturated carboxylic acids.

The polyolefin (C) is advantageously chosen from LLDPE, VLDPE, polypropylene, ethylene/vinyl acetate copolymers or ethylene/alkyl (meth)acrylate copolymers. The relative density can advantageously be between 0.86 and 0.965 and the melt flow index (MFI) can be between 0.3 and 40.

The functionalized polyolefin (D) is a polymer comprising α-olefin units and epoxide or carboxylic acid or carboxylic acid anhydride units.

Mention may be made, by way of example, of the above polyolefins (C) grafted with unsaturated epoxides, such as glycidyl (meth)acrylate, or with carboxylic acids, such as (meth)acrylic acid, or alternatively with unsaturated carboxylic acid anhydrides, such as maleic anhydride.

Mention may also be made to the functionallized polyolefins (D) comprising:

copolymers of ethylene, of an unsaturated epoxide and optionally of an unsaturated carboxylic acid ester or salt or of a saturated carboxylic acid vinyl ester. These are, for example, ethylene/vinyl acetate/glycidyl (meth) acrylate copolymers or ethylene/alkyl (meth)acrylate/ glycidyl (meth)acrylate copolymers, copolymers of ethylene, of an unsaturated carboxylic acid anhydride and/or of an unsaturated carboxylic acid which can be partially neutralized by a metal (such as Zn) or an alkali metal (such as Li) and, optionally, of an unsaturated carboxylic acid ester or of a saturated carboxylic acid vinyl ester. These are, for example, ethylene/vinyl acetate/maleic anhydride copolymers or ethylene/alkyl (meth)acrylate/maleic anhydride copolymers or alternatively ethylene/Zn or Li (meth) acrylate/maleic anhydride copolymers, polyethylene, polypropylene or ethylene-propylene copolymers grafted or copolymerized with an unsaturated carboxylic acid anhydride and then condensed with a polyamide (or a polyamide oligomer) which is monoaminated. These products are described in EP 342,066.

The functionalized polyolefin (D) is advantageously chosen from ethylene/alkyl (meth)acrylate/maleic anhydride copolymers, ethylene/vinyl acetate/maleic anhydride copolymers or ethylene-propylene copolymers, mostly formed from propylene, grafted with maleic anhydride and then condensed with monoaminated polyamide-6 or monoaminated caprolactam oligomers.

Preferably, (D) is an ethylene/alkyl (meth)acrylate/maleic anhydride copolymer comprising up to 40% by weight of alkyl (meth)acrylate and up to 10% by weight of maleic anhydride.

The alkyl (meth)acrylate can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

The proportions by weight of the various constituents are advantageously:

$50\% \leq A+B \leq 80\%$ and $20\% \leq C+D \leq 50\%$, the total being 100% (by weight).

According to another form of the invention, the proportions of A and B are such that $0.06 \leq A/B \leq 15$ and preferably $0.5 \leq A/B \leq 15$.

The amount of (D) depends on the number of functional groups which it carries and on their reactivity.

If (D) carries few functional groups, a larger amount of it is needed.

As regarding copolymers having from 1 to 10% by weight of maleic anhydride, of glycidyl methacrylate or of (meth) acrylic acid, D can be such that $0.1 \leq D/C \leq 0.5$.

Compositions which are particularly preferred are such that:

$55\% \leq A+B \leq 80\%$   $20\% \leq C+D \leq 45\%$ the total being 100% (by weight)

$0.5 \leq A/B \leq 15$ $0.2 \leq D/C \leq 0.4$.

(A) is PA-6 or PA-6,6

(B) is a copolymer containing PA-6 blocks and PTMG blocks (C) is a VLDPE (D) is an ethylene/alkyl (meth)acrylate/maleic anhydride copolymer.

Other preferred compositions are such that:

the proportions of (A), (B), (C) and (D) are the same as above and:

(A) is PA-6 or PA-6,6

(B) is a copolymer containing PA-6 blocks and PTMG blocks (C) is polypropylene (D) is an ethylene-propylene copolymer, mostly formed from propylene, grafted with maleic anhydride and then condensed with monoaminated polyamide-6 or monoaminated caprolactam oligomers.

These compositions of the invention can also comprise fillers, flame-retardants, release or antiblocking agents, antioxidants or agents for combating U.V. radiation.

These compositions are prepared by mixing in the molten state (e.g. twin-screw extruder, Buss single-screw extruder) according to the usual techniques for thermoplastics.

It has been also discovered that the films manufactured with the compositions of the invention have very good impact strength and very good resistance to bending.

The film of the invention can be prepared by mixing the products (A) to (D) in the molten state, followed by extrusion blow-moulding or extrusion in a flat or cylindrical die. The impact strength increases as the quantity of (B) is increased.

The thickness of the film can be between 10 and 300 µm.

The Applicants have discovered that the compositions for manufacturing the films of the invention can be obtained by blending the components in the extruder which feeds the device for manufacturing the film.

It is sufficient to feed the extruder with the products (A), (B), (C) and (D), without it being necessary to mix them beforehand or to prepare masterbatches.

3. DESCRIPTION OF THE PREFERRED EMBODIMENTS

In the following examples:

PA-6 denotes: a polyamide-6 with a melt flow index (MFI) of between 17 and 20 (at 235° C./2.16 kg)

Pebax 1 denotes: a copolymer containing PA-6 blocks with an Mn of 1,300 and PTMG blocks with an Mn of 650 having a Shore D hardness of 56 and an intrinsic viscosity of 1.38, measured in meta-cresol at 25° C. for an initial concentration of 0.8 g/100 ml, VLDPE denotes: a PE of very low density about 0.900 and with an MFI of 0.8 (190° C./2.16 kg), Lotader 1 denotes: an ethylene/butyl acrylate/maleic anhydride copolymer with a composition by weight of 90.9/6/3.1 and with an MFI of 5 (190° C./2.16 kg), PP denotes: a polypropylene with an MFI of 1.5-2 (235° C./2.16 kg), BC denotes: an ethylene/propylene backbone copolymer containing 12% by weight of ethylene grafted with maleic anhydride (1 wt % MAH with respect to the backbone) and then condensed with a monoaminated caprolactam oligomer with a degree of polymerization of about 22, the amount of these oligomers being 25 wt % with respect to the backbone.

EXAMPLES 1 to 9

Films with a thickness of about 55 µm were manufactured. The composition for each example is reported in Table 1. The proportions are by weight unless otherwise indicated.

These films were conditioned for 48 hours at 23° C. in an atmosphere with a relative humidity (RH) of 50% before testing.

The test results are reported in Tables 2, 3 and 4.

TABLE 1

| Material | Example Number | | | | | | | | |
|---|---|---|---|---|---|---|---|---|---|
| | 1 | 2 | 3 | 4 | 5 | 6 | 7 | 8 | 9 |
| PA-6 | 100 | 65 | 62 | 58.5 | 55.5 | 65 | 58.5 | 52 | 45.5 |
| Pebax 1 | | | 5 | 10 | 15 | | 10 | 20 | 30 |
| PP | | | | | | 27 | 24 | 21.5 | 19 |
| VLDPE | | 25 | 23.5 | 22.5 | 21 | | | | |
| BC | | | | | | 9 | 7.5 | 6.5 | 5.5 |
| Lotader 1 | | 10 | 9.5 | 9 | 8.5 | | | | |
| Total | 100 | 100 | 100 | 100 | 100 | 100 | 100 | 100 | 100 |

TABLE 2

| | Unit of Measurement | 1 | 2 | 3 | 4 | 5 |
|---|---|---|---|---|---|---|
| Dart Test | | | | | | |
| (Method B-h 1.5 m) | | | | | | |
| Mass | g | | 1100 | 1250 | 1600 | 1600 |
| Minimum P, 100% unbroken | g | | 845 | 1145 | 1495 | 1625 |
| Maximum P, 100% broken | g | | 1245 | 1595 | 1845 | 1845 |
| Tear Strength* (ASTM D 1922-67) | | | | | | |
| Parallel direction | | | | | | |
| Average | cN | 64 | 60 ± 3 | 65 ± 14 | 66 ± 4 | 77 ± 14 |
| Minimum | cN | | 56 | 52 | 60 | 60 |
| Maximum | cN | | 64 | 104 | 72 | 104 |
| Perpendicular direction | | | | | | |
| Average | cN | 67 | 108 ± 5 | 127 ± 7 | 144 ± 14 | 126 ± 4 |
| Minimum | cN | | 100 | 116 | 128 | 120 |
| Maximum | cN | | 116 | 140 | 176 | 132 |

* = Format of Result = Value ± Std. Deviation

TABLE 3

| | Unit of Measurement | 1 | 2 | 3 | 4 | 5 |
|---|---|---|---|---|---|---|
| Tensile Properties* (ISO R527-1B) | | | | | | |
| Parallel direction** | | | | | | |
| Threshold E | % | 19 | 15.5 ± 0.5 | 27.2 ± 1 | 27.7 ± 2 | 26.3 ± 1 |
| Threshold Stress S | MPa | 31 | 28.5 ± 0.5 | 31.2 ± 0.5 | 29.7 ± 0.7 | 35.6 ± 3.6 |
| Break | % | 288 | 335 ± 24 | 325 ± 9 | 330 ± 23 | 330 ± 14 |
| Break Stress S | MPa | 71 | 47 ± 4 | 59 ± 2 | 61 ± 7 | 66 ± 6 |
| Perpendicular direction | | | | | | |
| Threshold E | % | 12 | 25.4 ± 3 | 17.9 ± 2 | 14.6 ± 1.7 | 13.2 ± 2 |
| Threshold Stress S | MPa | 29.1 | 0.8 ± 29.9 | 0.2 ± 0.2 | 33.1 ± 0.3 | 33.1 ± 2.4 |
| Break E | % | 300 | 305 ± 22 | 325 ± 40 | 370 ± 10 | 360 ± 25 |
| Break Stress S | MPa | 67 | 52 ± 4 | 48 ± 6 | 60 ± 2 | 62 ± 2 |

*Format of Results = Value ± Standard Deviation
**E = Elongation
S = Stress

TABLE 4

MECHANICAL PROPERTIES OF THE FILMS AFTER CONDITIONING FOR 48 HOURS AT ROOM TEMPERATURE AND 50% RELATIVE HUMIDITY

| STANDARD | TEST | UNIT OF MEASUREMENT | Examples 6 | 7 | 8 | 9 |
|---|---|---|---|---|---|---|
| | TEAR STRENGTH* | | | | | |
| NFT 54-141 | CONSTANT RADIUS | | | | | |
| | Direction parallel to the extrusion direction | N | 0.74 ± 0.2 | 1.10 ± 0.44 | 1.41 ± 0.50 | 0.89 ± 0.40 |
| | Direction perpendicular to the extrusion direction | N | **0.64 ± 0.0 | 0.84 ± 0.11 | 1.20 ± 0.14 | 1.03 ± 0.07 |

TABLE 4-continued

MECHANICAL PROPERTIES OF THE FILMS AFTER CONDITIONING FOR 48 HOURS AT ROOM TEMPERATURE AND 50% RELATIVE HUMIDITY

| STANDARD | TEST | UNIT OF MEASUREMENT | Examples 6 | 7 | 8 | 9 |
|---|---|---|---|---|---|---|
| | DART TEST IMPACT | | | | | |
| NFT 54-109 | Method A (66 cm) | g | 65 | 194 | 253 | 396 |
| Narrow band | TENSION PROPERTIES* | | | | | |
| l = 15 mm | Parallel direction | | | | | |
| r = 500 mm/min | Stress at break | N | 68.7 ± 4.4 | 68.1 ± 8.3 | 78.9 ± 6.1 | 65.9 ± 2.9 |
| lo = 50 mm | Elongation at break | % | 545 ± 24 | 590 ± 54 | 652 ± 33 | 633 ± 13 |
| Narrow band | TENSION PROPERTIES* | | | | | |
| l = 15 mm | Perpendicular direction | | | | | |
| r = 500 mm/min | Stress at break | N | 57.2 ± 1.9 | 60.1 ± 3.7 | 59.1 ± 2.9 | 56.2 ± 1.9 |
| lo = 50 mm | Elongation at break | % | 524 ± 19 | 590 ± 30 | 610 ± 24 | 619 ± 17 |

*Format of Results = Value ± Standard Deviation
**7 samples out of 10 tear outside the constant radius

What is claimed is:

1. A film having a thickness and an impact strength, wherein the film comprises a composition which comprises:
   (a). a polyamide-6 or a polyamide-6,6 as polyamide (A),
   (b). a copolymer containing polyamide-6 blocks and polytetramethylene glycol blocks as polymer (B),
   (c). a polyolefin (C) selected from a very low density polyethylene and polypropylene, and
   (d). a functionalized polyolefin (D) chosen from the group consisting of an ethylene/alkyl (meth)acrylate/maleic anhydride copolymer; an ethylene/vinyl acetate/maleic anhydride copolymer; and an ethylene-propylene copolymer, mostly formed from propylene, grafted with maleic anhydride and then condensed with monoaminated polyamide-6 or monoaminated caprolactam oligomers; wherein
   $55\% \leq A+B \leq 80\%$,
   $20\% \leq C+D \leq 45\%$,
   $A+B+C+D=100\%$ (by weight),
   $1.52 \leq A/B \leq 15$,
   $0.2 \leq D/C \leq 0.4$; and wherein the impact strength determined by a Dart Test is greater than that of a film containing the same proportions of (A) (C) and (D) but not containing (B).

2. The film according to claim 1 wherein
   the polyolefin (C) is polypropylene, and
   the functionalized polyolefin (D) is an ethylene-propylene copolymer, mostly formed from propylene, grafted with maleic anhydride and then condensed with monoaminated polyamide-6 or monoaminated caprolactam oligomers.

3. The film according to claim 2, wherein the impact strength as determined by the Dart Test NFT 54-109 Method A is $\geq$ about 194 g.

4. The film according to claim 1, wherein the impact strength as determined by the Dart Test NFT-54-109 Method B is $\geq$ about 1250 g.

5. The film according to claim 1, wherein the polyolefin (C) is a very low density polyethylene and the functionalized polyolefin (D) is an ethylene/alkyl (meth)acrylate/maleic anhydride copolymer.

6. A film having a thickness and a tear strength, wherein the film comprises a composition which comprises:
   (a) at least one polyamide (A),
   (b) at least one polymer (B) comprising polyamide-6 blocks and polytetramethylene glycol blocks,
   (c) at least one polyolefin (C), and
   (d) at least one functionalized polyolefin (D) chosen from the group consisting of ethylene/alkyl (meth)acrylate/maleic anhydride copolymers, in which:
   $55\% \leq A+B \leq 80\%$,
   $20\% \leq C+D \leq 45\%$,
   $A+B+C+D=100\%$ (by weight),
   $1.52 \leq A/B \leq 15$, and
   $0.2 \leq D/C \leq 0.4$; wherein
   (A) is polyamide-6 or polyamide-6,6, and
   (C) is a very low density polyethylene (VLDPE),
   and such that the film's tear strength is greater than that of a film containing the same proportions of (A), (C) and (D) but not containing (B) providing that both tear strengths are determined by an identical method.

* * * * *